United States Patent

Bauer

Patent Number: 5,934,435
Date of Patent: Aug. 10, 1999

[54] DISC ASSEMBLY

[75] Inventor: Walter Bauer, Eppelheim, Germany

[73] Assignee: Borg-Warner Automotive, Inc., Sterling Heights, Mich.

[21] Appl. No.: 08/842,678

[22] Filed: Apr. 15, 1997

Related U.S. Application Data

[60] Provisional application No. 60/032,538, Dec. 10, 1996.

[51] Int. Cl.$^6$ ................................................. F16D 13/60
[52] U.S. Cl. .................................. 192/113.34; 192/70.14; 192/107 R
[58] Field of Search ........................... 192/107 R, 113.3, 192/113.31, 113.34, 70.14; 188/264 D, 264 R, 264 A

[56] References Cited

U.S. PATENT DOCUMENTS

| | | |
|---|---|---|
| 1,808,511 | 6/1931 | Robbins . |
| 2,174,240 | 9/1939 | Glenney . |
| 4,157,748 | 6/1979 | Beaujean ........................ 192/58.41 |
| 4,753,332 | 6/1988 | Bieber et al. . |
| 4,995,500 | 2/1991 | Payvar . |
| 5,005,676 | 4/1991 | Gassiat ......................... 192/107 C X |
| 5,074,394 | 12/1991 | Motohashi . |
| 5,076,409 | 12/1991 | Graton et al. ..................... 192/107 C |
| 5,094,331 | 3/1992 | Fujimoto et al. . |
| 5,101,953 | 4/1992 | Payvar . |
| 5,325,950 | 7/1994 | Kimberlin . |
| 5,332,075 | 7/1994 | Quigley et al. . |
| 5,335,765 | 8/1994 | Takakura et al. . |
| 5,460,255 | 10/1995 | Quigley . |
| 5,495,927 | 3/1996 | Samie et al. . |

FOREIGN PATENT DOCUMENTS

| | | |
|---|---|---|
| 1216624 | 5/1966 | Germany . |
| 2228053 | 8/1990 | United Kingdom . |

*Primary Examiner*—Charles A. Marmor
*Assistant Examiner*—Saúl Rodriguez
*Attorney, Agent, or Firm*—Emch, Schaffer, Schaub et al.; Greg Dziegielewski

[57] ABSTRACT

A disc assembly for use in, for example, an automatic transmission is disclosed. The disc assembly includes a pair of spaced core members (15-16, 25-26, 36-37, 56-57). A friction facing (17-18, 27-28, 42-43, 62, 77-78) is positioned on the outer side of at least one of said core members. A grooved cooling layer (20, 30, 45, 61) is positioned between the pair of spaced core members and is in fluid communication with a cooling fluid. The disc assembly is used with other disc assemblies and other power elements (12, 48, 65, 83) to form a clutch assembly for the transmission.

12 Claims, 7 Drawing Sheets

DISC ASSEMBLY

This application claims the benefit of U.S. Provisional Application No. 60,032,538, filing date Dec. 10, 1996.

BACKGROUND OF THE INVENTION

Disc assemblies are known in the art and are often used in connection with clutch assemblies and brake assemblies. One use of disc assemblies are as clutch assemblies in automatic transmissions.

In a shifting operation of an automatic transmission, mating plates are utilized with the disc assemblies. In most automatic transmission uses, the disc assemblies must be lubricated. The prior art disc assemblies often include core plates which are covered with a friction layer or friction facing. Because of the paper-type structure of the facing, poor heat conduction often results during shifting. This can sometimes be compensated for by the absorption of oil into the pores of the facing during open clutch operation. During the closing of the clutch operation, the evaporation of oil often results in a temperature drop.

In order to obtain the desired cooling, it is known in the prior art to groove the outer linings or facings. The grooves are used as passageways in an oil cooling system. The oil volume flowing through the disc assembly prevents damage to the linings, seals and to the overall clutch assemblies. A grooved friction lining or facing is disclosed in U.S. Pat. No. 4,878,282 granted Nov. 7, 1989.

SUMMARY OF THE INVENTION

The present invention is directed to an improved disc assembly. The improved disc assembly includes a pair of spaced core members. Friction facings or liners are adhered to one or both of the outer surfaces of the spaced core members. A separate cooling layer is positioned between the pair of spaced core members adjacent their inner surfaces. The cooling layer can be a grooved friction lining or facing layer. The cooling layer is grooved to a predetermined groove configuration. The grooves receive a cooling fluid during operation of, for example, an automatic transmission.

DESCRIPTION OF THE PREFERRED EMBODIMENT

Figure 1:
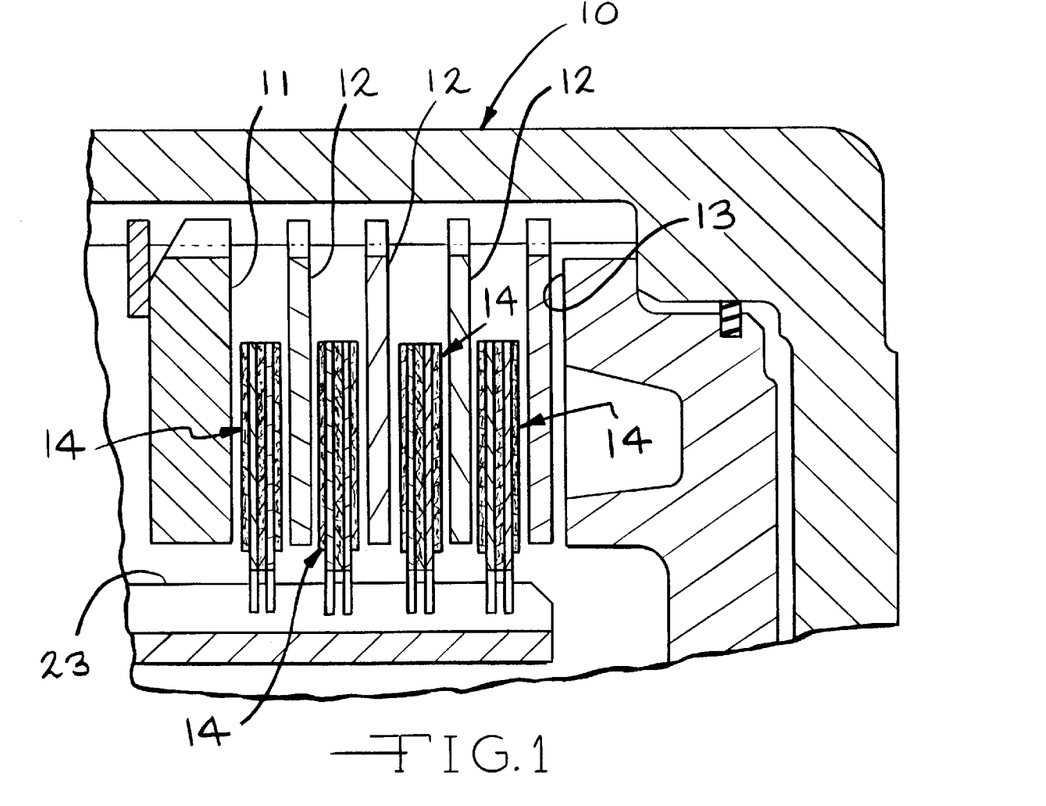
FIG. 1 is a fragmentary cross-sectional view showing a plurality of disc assemblies, according to the present invention, positioned within an automatic transmission.

A power transmission is generally indicated by the reference number 10 in FIG. 1. The power transmission 10 includes a plurality of power elements 11, 12 and 13.

A plurality of disc assemblies, according to the present invention, are generally indicated by the reference number 14. The disc assemblies 14 cooperate with the power elements 11, 12 and 13 of the power transmission in a manner well known in the prior art.

Figure 2:
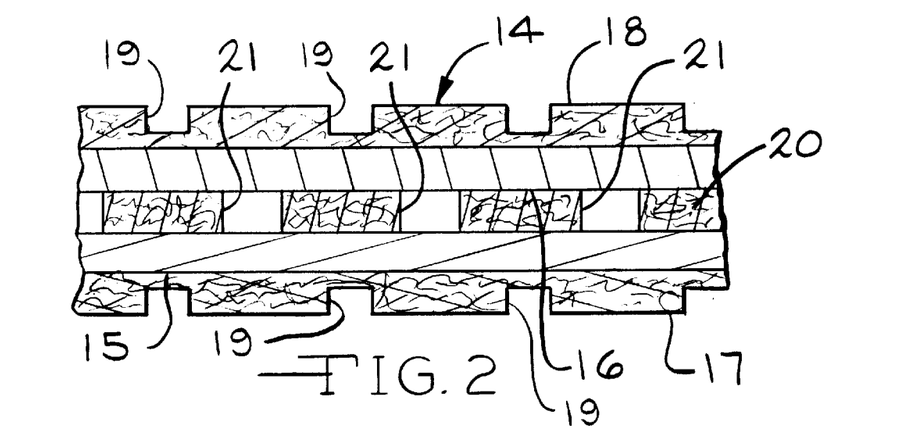
FIG. 2 is an enlarged fragmentary cross-sectional view of the disc assembly shown in FIG. 1, according to the present invention.
Figure 3:
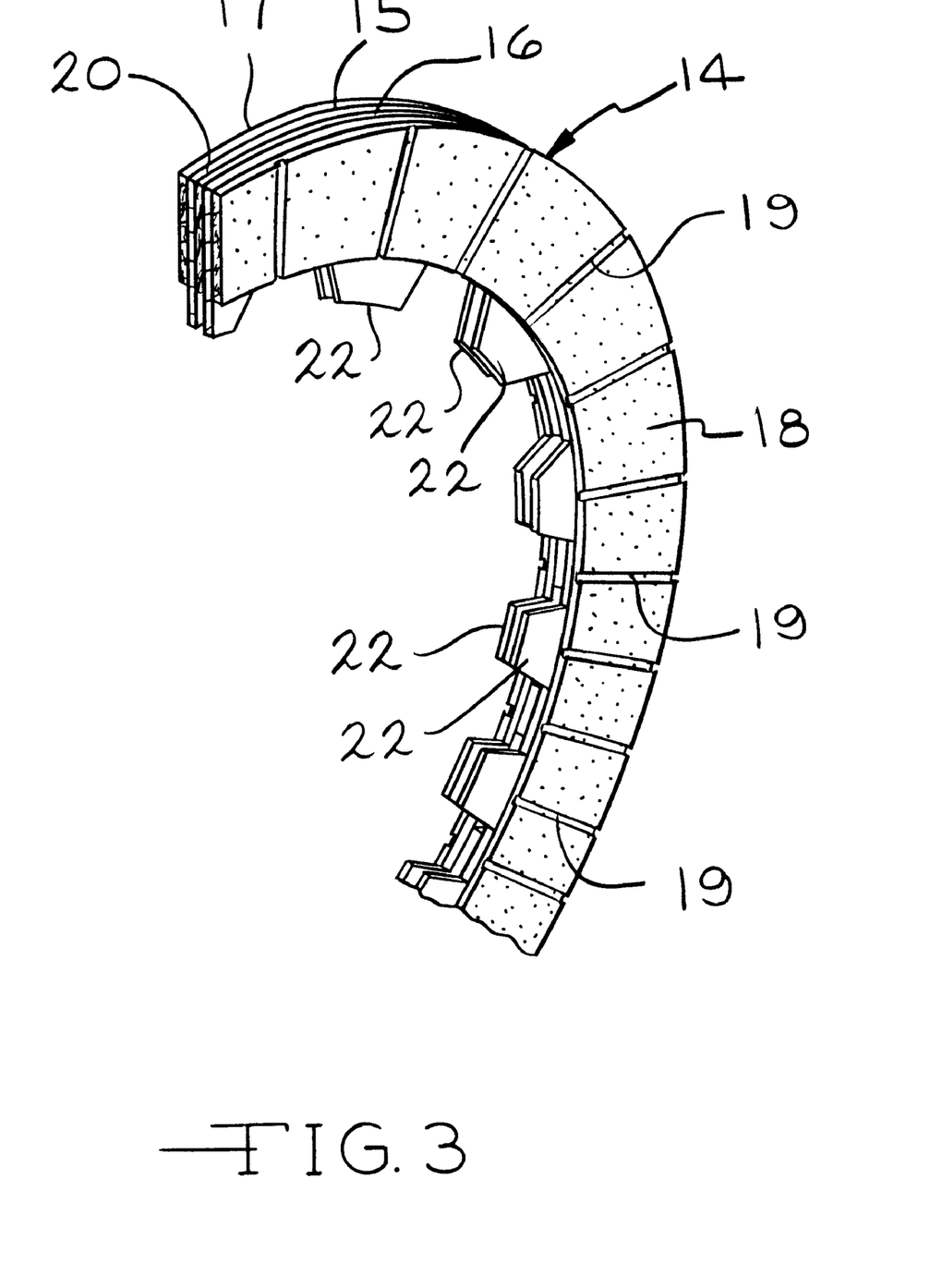
FIG. 3 is a fragmentary perspective view of the disc assembly shown in FIGS. 1 and 2.
Figure 4:
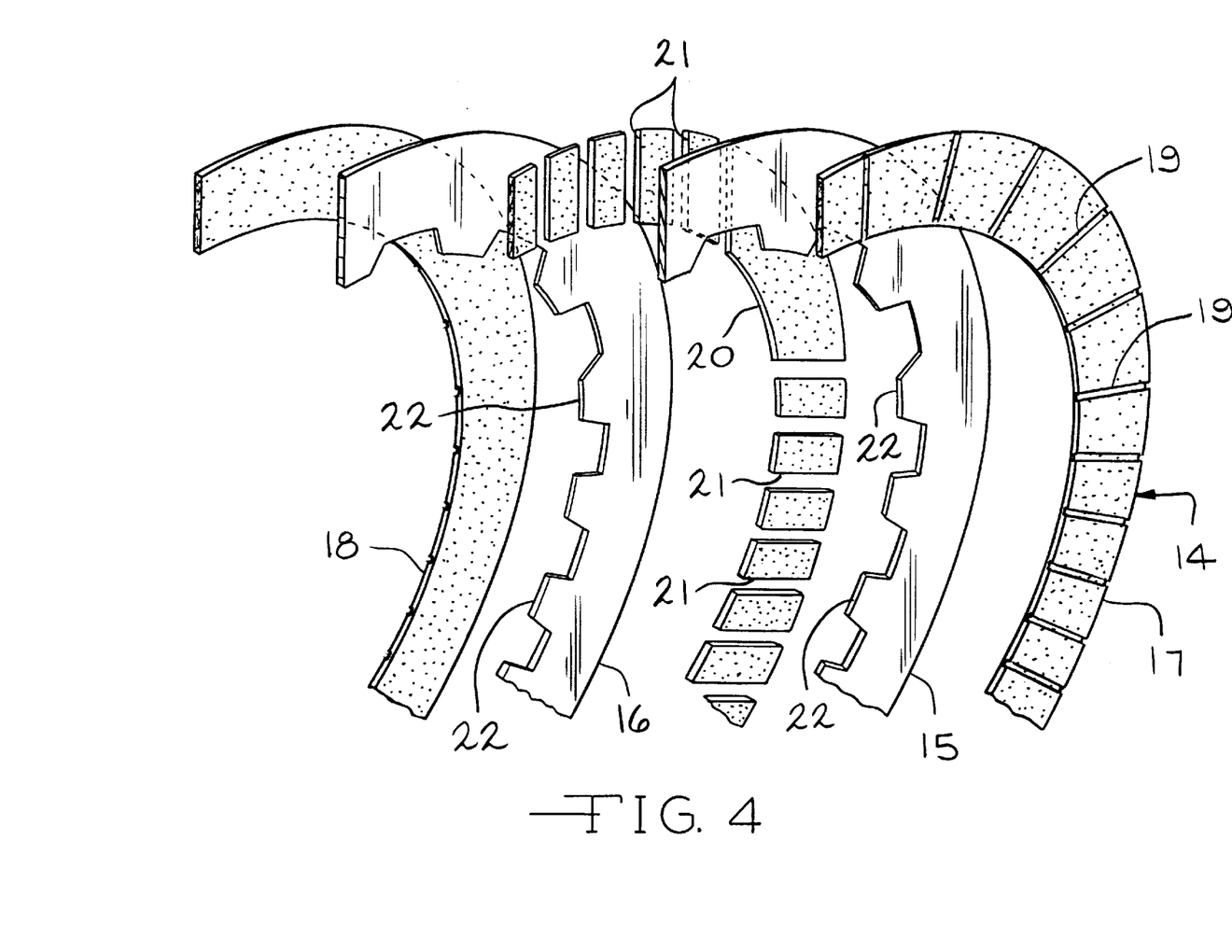
FIG. 4 is a fragmentary exploded view of the disc assembly, according to the present invention shown in FIGS. 1–3.

Referring to FIGS. 2–4, the disc assembly 14 is generally circular and includes a pair of spaced core members 15 and 16. The core members 15 and 16 are constructed of metal, generally steel. The core members 15 and 16 have a thickness which is reduced from a conventional steel core. A circular friction lining or friction facing 17 is adhered to the outer surface of the core member 15 and a friction lining or friction facing 18 is adhered to the outer surface of the core member 16. The friction facings 17 and 18 may be continuous or segmented and can be constructed of a sintered metal or preferably from a paper layer impregnated with a resin which is fed through a blanking press. The friction facings for wet-type clutches are generally pre-grooved to allow for cooling oil to flow over the friction facing during clutch operation. Grooves 19 are provided in the friction facings 17 and 18. Examples of friction facings are disclosed in U.S. Pat. Nos. 5,332,075 and 5,460,255.

An important feature of the present invention is a circular cooling ring or layer 20 which is positioned between the pair of spaced core members 15 and 16 adjacent the inner surfaces of the spaced core members 15 and 16. The cooling layer 20 is circular and can be constructed of, for examples, metal or paper. In the preferred embodiment shown in FIGS. 1–4, the cooling layer 20 is constructed of a resin coated paper. An important feature of the present invention is that the interior cooling layer 20 includes a plurality of grooves 21 which communicate with inlets and outlets. The grooves 21 may be formed by several methods including, pressing, machining or punching. As shown in FIG. 3, the core members 15 and 16 include projections or teeth 22 which are aligned. The aligned teeth 22 are received by the splines 23 (See FIG. 1).

During a shifting operation of the transmission, oil flows through the clutch assembly. In the present invention, the grooved cooling layer 20 is adhered between the inner surfaces of the core members 15 and 16 and provides a pathway for cooling oil which reaches the inner or reverse sides of the core members 15 and 16. In addition, oil is received by the pores of the friction facing 17 and 18 positioned on the outer surfaces of the core members 15 and 16. In many embodiments, the friction facings 17 and 18 are also grooved to provide additional paths for the cooling fluid.

Many grooving patterns are known in the art and are used in different situations. Examples are illustrated in FIGS. 3, 4, 5 and 10. The above mentioned U.S. Pat. No. 4,878,282 discloses a method of forming grooves in friction linings.

The thickness of standard core plates is normally 0,8 mm. and the thickness of a standard friction facing is normally 0,4 mm. The core members 15 normally have a thickness approximately one-half the thickness of a standard core plate. The friction facings 17 and 18 have a thickness approximately equal to the thickness of a standard friction facing. The thickness of the layer 20 is normally at least as thick as one of the facings 17 and 18. The thickness of the layer 20 varies with its composition and also with respect to desired oil flow within the friction facing grooves 19 and the grooves 21 of the cooling layer 20.

The disc assembly 14 provides cooling which effects a decrease in temperature level. In other applications, an unchanged temperature can be expected with low oil flows. The cooling effect of the disc assembly 14, according to the present invention, reduces drag torques. The disc assembly 14 provides a considerably better temperature gradient than the prior art.

Figure 5:
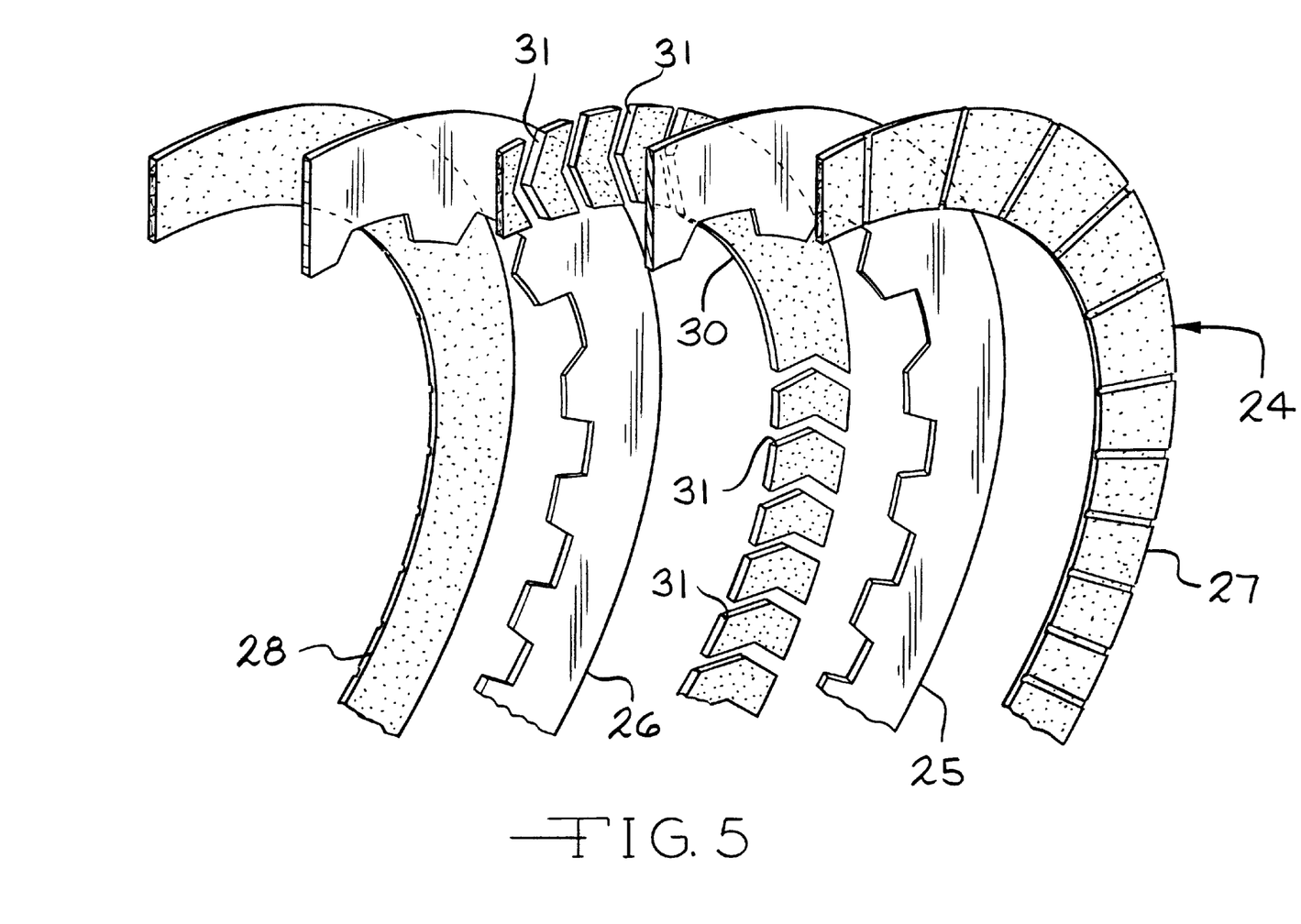
FIG. 5 is an exploded view similar to FIG. 4 showing another embodiment of a disc assembly, according to the present invention.

Referring to FIG. 5, another embodiment of a disc assembly, according to the present invention is generally indicated by the reference number 24. The disc assembly 24 includes a pair of circular, spaced core members 25 and 26 which are preferably metal. Friction facings 27 and 28 are adhered to the outer surfaces of the spaced core members 25 and 26. The friction facings 27 and 28 are preferably a resin coated paper facing. A grooved cooling layer 30 is positioned between the core members 25 and 26. The cooling layer 30 defines a plurality of grooves 31 having a different configuration than those shown in the FIG. 4 embodiment. The cooling layer 30 may be constructed of various materials. The current cooling layer 30, shown in FIG. 5, is constructed of a resin coated paper, which is adhered to the spaced core members 25 and 26.

Figure 6:
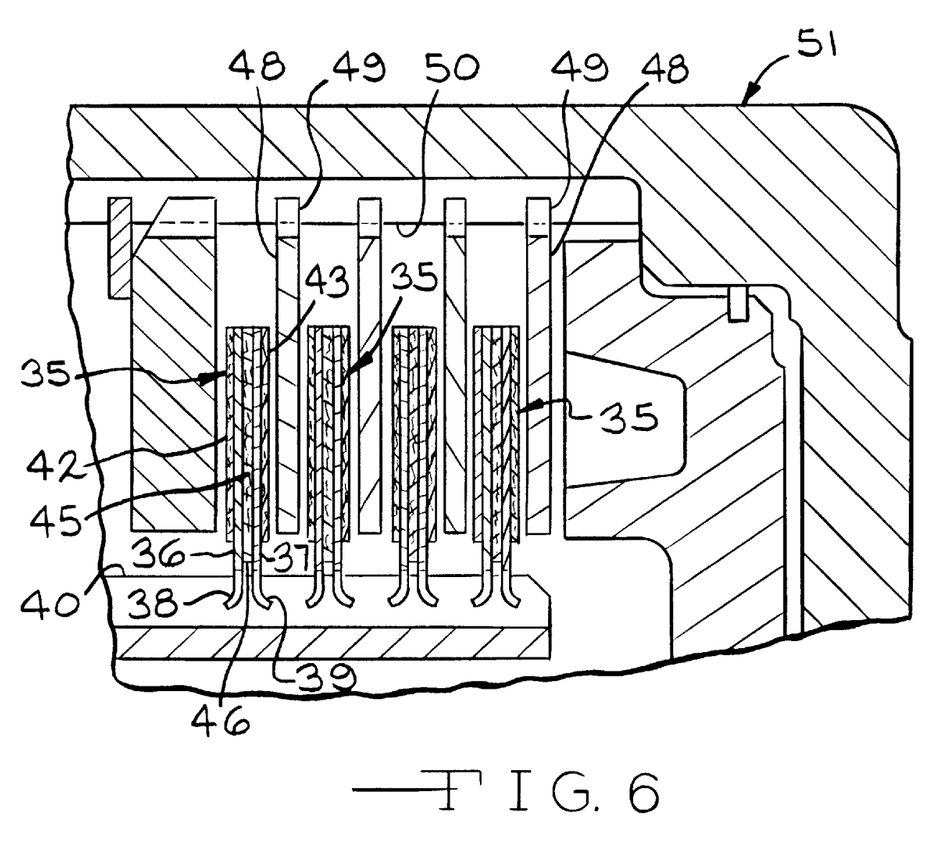
FIG. 6 is another embodiment of a disc assembly, according to the present invention, positioned with a transmission.

Referring to FIG. 6, another embodiment of the present invention is shown. A disc assembly 35 includes a pair of spaced core members 36 and 37, which are preferably metal. The core members 36 and 37 define inner projections or teeth 38 and 39 which define openings to receive splines 40.

Friction facings 42 and 43 are mounted on the core members 36 and 37. An inner grooved liner or cooling layer 45 is mounted between the core members 36 and 37 and includes an inner diameter 46 which is recessed to the root diameter of the spline 40. The projections or teeth 38 and 39 of the core members 36 and 37 are bent or curved away from one another forming a nip which directs oil toward the grooves of the cooling layer 45. The recessed inner diameter of the layer 45 and the outwardly directed teeth 38 and 39 generate an oil ring forcing oil flow to the channels defined by the grooves of the layer 45.

A plurality of power elements or separator members 48 having teeth 49 are positioned respectively between the disc assemblies 35. The teeth 49 are received by outer splines 50 defined by the transmission case 51.

Figure 7:
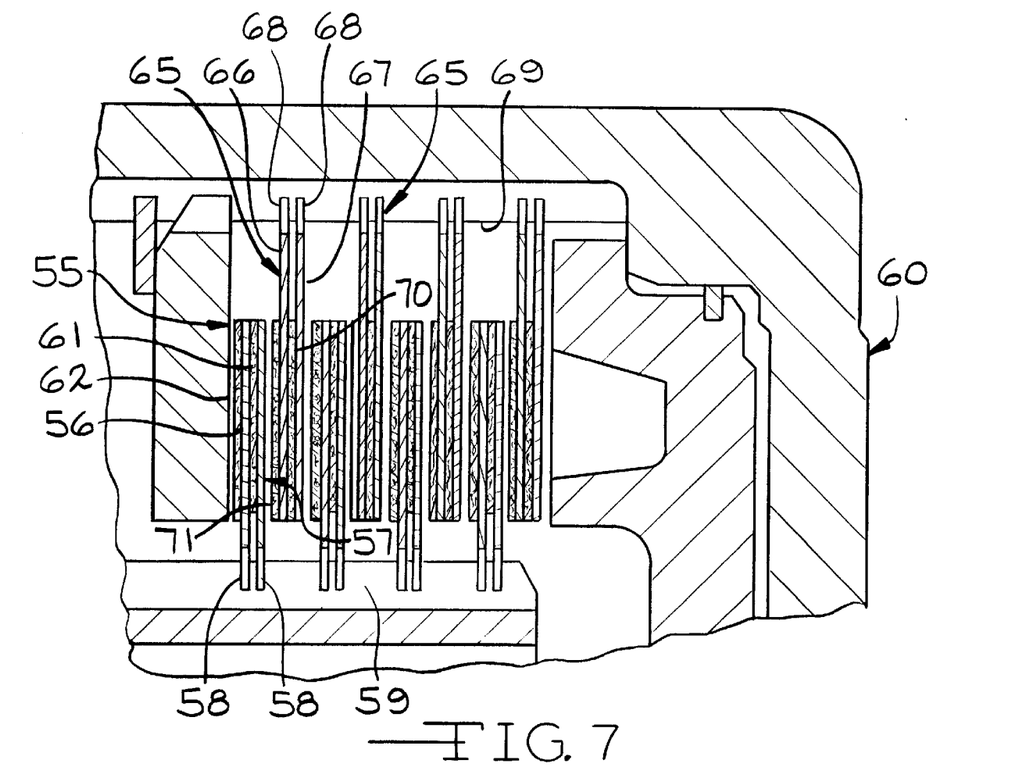
FIG. 7 is still another embodiment of a disc assembly and separator assembly, positioned within a transmission.
Figure 8:
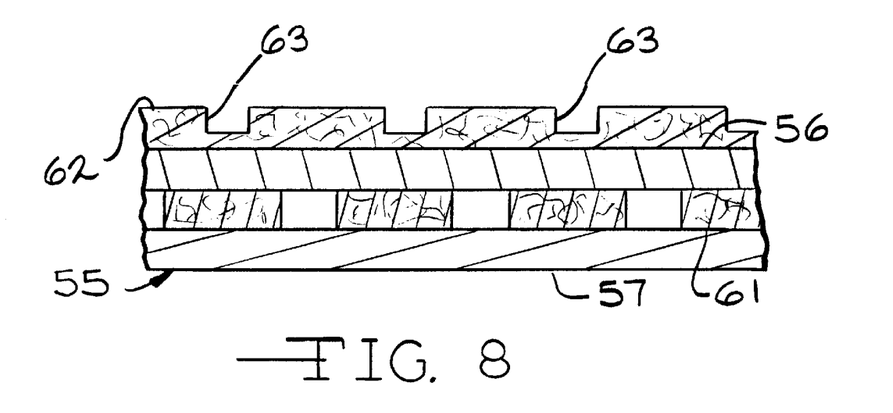
FIG. 8 is a fragmentary cross-section view of the disc assembly of the FIG. 7 embodiment, shown on an enlarged scale.

Still another embodiment of a disc assembly according to the present invention, is indicated by the reference number 55 in FIGS. 7 and 8. The disc assembly 55 is directed to an assembly having a friction liner or facing on the outer side of only one of the core members.

The disc assembly 55 includes a pair of circular spaced core members 56 and 57 having inner projections or teeth 58. The teeth 58 are aligned and received by splines 59 of a transmission 60. The core members 56 and 57 are preferably metal. A circular grooved cooling layer 61 is mounted between the core members 56 and 57. The layer 61 can be construed of various materials including metal, plastic and resin coated paper.

A circular friction liner or facing 62 is mounted on the core member 56. The friction facing 62 preferably defines a plurality of grooves 63. The grooves can be of various patterns, for example the prior art pattern 64 illustrated in FIG. 10.

In the FIG. 7 embodiment, a plurality of power elements or separator assemblies 65 are positioned between the disc assemblies 55. The separator assemblies 65 include a pair of spaced, circular separator plates 66, 67 which include aligned outer projections or teeth 68. The outer teeth 68 are received by outer splines 69 defined by the transmission 60. A circular layer 70 is mounted between the separator plates 66, 67. A circular friction liner or facing 71 is mounted on the outside of the separator plate 66. No friction facing is mounted on the outside of the separator plate 67. Rather, the outside of the separator plate 67 engages the friction facing 62 of the next one of the disc assemblies 55, as shown in FIG. 7.

Figure 9:
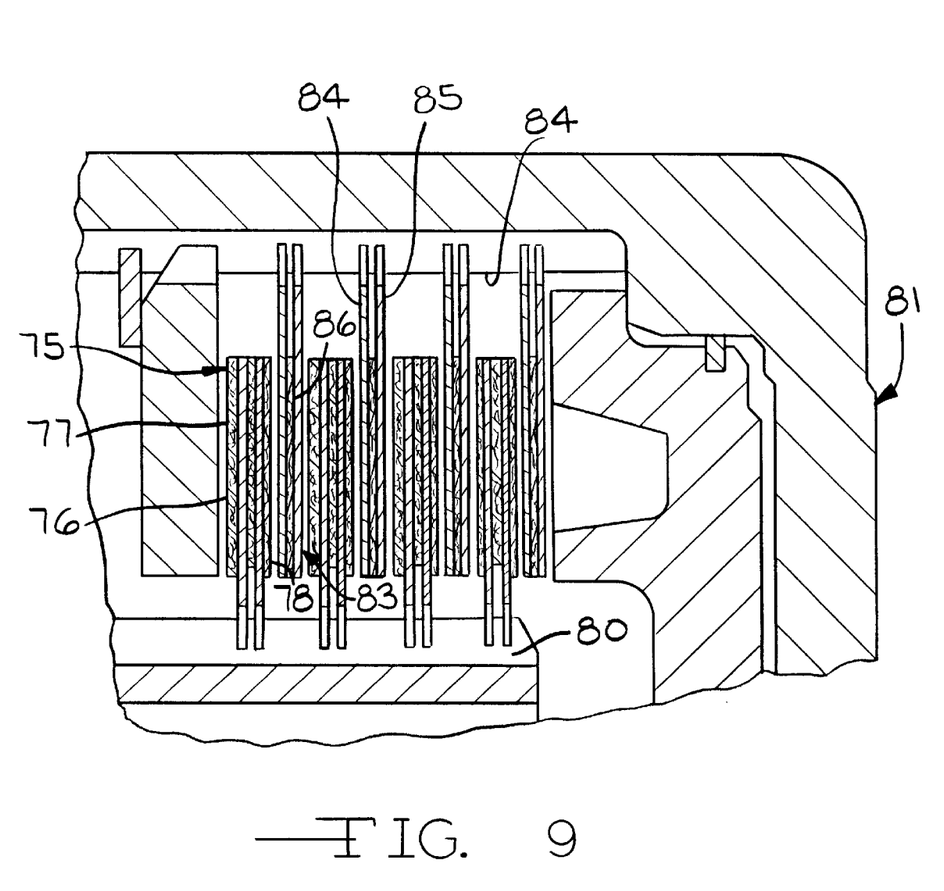
FIG. 9 is a still further embodiment of a disc assembly and separator assembly, positioned with a transmission.
Figure 10:
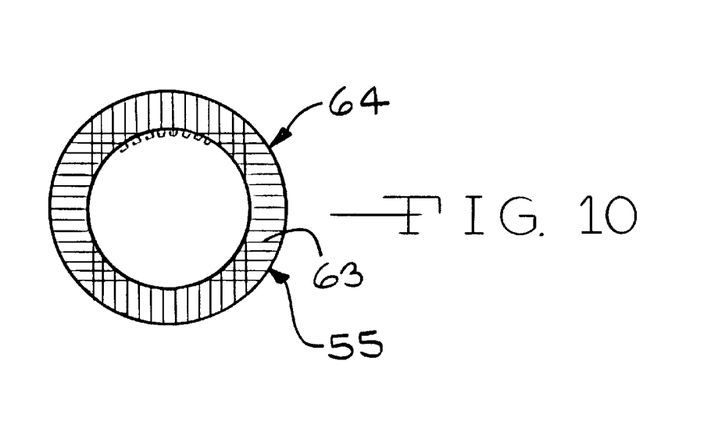
FIG. 10 is a plan view of the grooving pattern of the friction facing of the embodiment of the disc assembly shown in FIGS. 7 and 8.

Another embodiment of a disc assembly, according to the present invention is indicated by the reference number 75 in FIG. 9. In this embodiment a double friction faced assembly 76 is provided which is similar to the disc assembly 14, illustrated in FIGS. 1–4. The double friction faced assembly 76 includes grooved outer friction liners or facings 77, 78. The assembly 76 are received by splines 80 of a transmission 81.

In the FIG. 9 embodiment, a plurality of power elements or separator assemblies 83 are mounted on outer splines 84 of the transmission 81. The separator assemblies 83 are interleaved between the plurality of disc assemblies 75.

The separator assemblies 83 include a pair of spaced, circular separator plates 84, 85. A circular layer 86 is positioned between the separator plates 84, 85. Neither separator plate 84 or 85 includes an outer friction facing on its outer surface. The separator plates 84, 85 engage the adjacent friction facings 77, 78 of the plurality of core assemblies 75.

Many revisions may be made to the above described embodiments, without departing from the scope of the invention or from the following claims.

I claim:

1. A disc assembly, comprising a pair of spaced circular continuous metal core members (15-16, 25-26, 36-37, 56-57), having inner and outer surfaces, a friction facing (17-18, 27-28, 42-43, 62, 77-78) mounted on said outer surface adjacent at least one of said spaced core members and a circular cooling layer (20, 30, 45, 61) defining a plurality of grooves positioned between said pair of spaced core members adjacent said inner surfaces, whereby said grooves provide a pathway for cooling fluid.

2. A disc assembly, according to claim 1, wherein a friction facing (17-18, 27-28, 42-43, 77-78) is mounted adjacent said outer surface of each of said spaced core members each of said friction facings having a thickness less than the thickness of its adjacent one of said spaced core members.

3. A disc assembly, according to claim 1, wherein each of said spaced core members is constructed of metal.

4. A disc assembly, according to claim 1, wherein said friction facing is constructed of a resin coated paper layer.

5. A disc assembly, according to claim 1 and a circular power element (12, 48, 65, 83) positioned adjacent one of said outer surfaces of one of said core members.

6. A disc assembly, comprising a pair of spaced circular continuous metal core members (15-16, 26-26, 36-37, 56-57) having inner and outer surfaces, a friction facing (17-18, 27-28, 42-43, 77-78) adhered to said outer surface of each of said spaced metal core members and a circular cooling layer (20, 30, 45, 61) defining a plurality of grooves adhered between said spaced metal core members adjacent said inner surfaces whereby said grooves provide a pathway for cooling fluid.

7. A disc assembly, according to claim 6, wherein each of said friction facings is constructed of a resin coated paper layer, each of said friction facings having a thickness less than the thickness of its adjacent one of said spaced metal core members.

8. A disc assembly, according to claim 6, wherein said grooved cooling layer is constructed of a resin coated paper layer.

9. A disc assembly, comprising a pair of spaced, circular, metal, continuous core members (15-16, 25-26, 36-37, 56-57), having inner and outer surfaces, a circular friction facing (17-18, 27-28, 42-43, 62, 77-78) mounted on said outer surface adjacent at least one of said spaced core members, said friction facing being grooved and a circular cooling layer (20, 30, 45, 61) defining a plurality of grooves positioned between said pair of spaced core members adjacent said inner surfaces, whereby said plurality of grooves in said circular cooling layer provide a pathway for cooling fluid.

10. A disc assembly, according to claim 9, wherein a friction facing (17-18, 27-28, 42-43, 77-78) is mounted adjacent said outer surface of each of said spaced core members.

11. A disc assembly, according to claim 9, wherein each of said spaced core members is constructed of metal.

12. A disc assembly, according to claim 9, wherein said core members (36-37) each define a plurality of teeth (38-39) at their edges, said teeth of the respective core members curving away from one another.

* * * * *